Figure 1:
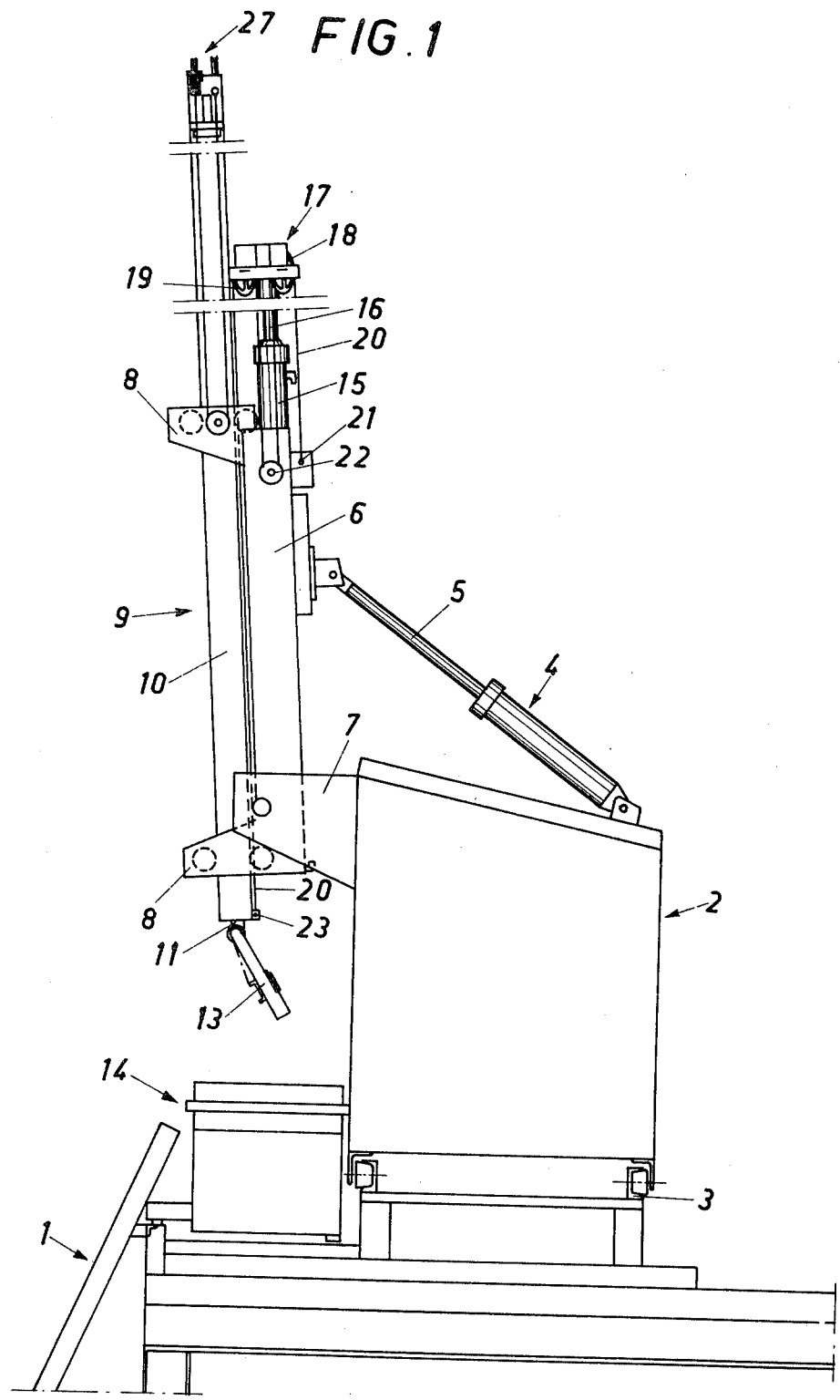

United States Patent [19]

Hansson

[11] 4,222,878
[45] Sep. 16, 1980

[54] RAKING EQUIPMENT FOR TRASHRACKS

[76] Inventor: Hans Hansson, Mölneby Basgården, 510 60 Överlida, Sweden

[21] Appl. No.: 949,691

[22] Filed: Oct. 10, 1978

[30] Foreign Application Priority Data

Oct. 11, 1977 [CA] Canada .................................. 288430

[51] Int. Cl.² ............................................. B01D 23/24
[52] U.S. Cl. .................................... 210/413; 210/159
[58] Field of Search ............... 210/154, 159, 162, 408, 210/413

[56] References Cited

U.S. PATENT DOCUMENTS

| | | | |
|---|---|---|---|
| 2,866,555 | 12/1958 | Nordell | 210/159 X |
| 3,193,104 | 7/1965 | Leach | 210/159 |
| 4,042,506 | 8/1977 | Wilson | 210/159 X |

Primary Examiner—William A. Cuchlinski, Jr.
Attorney, Agent, or Firm—Holman & Stern

[57] ABSTRACT

The raking machine is designed with two telescopical tube members, forming the rake arm, and with block means in combination with a hydraulic cylinder, controlling its displacement in and out.

The block means comprises block discs attached to the upper end of the outer part of the tube and a block disc displaceably attached to the upper end of the inner part of the tube and a wire running on these block discs.

The angle of the raking machine and the trashrack is controlled by a hydraulic cylinder.

3 Claims, 6 Drawing Figures

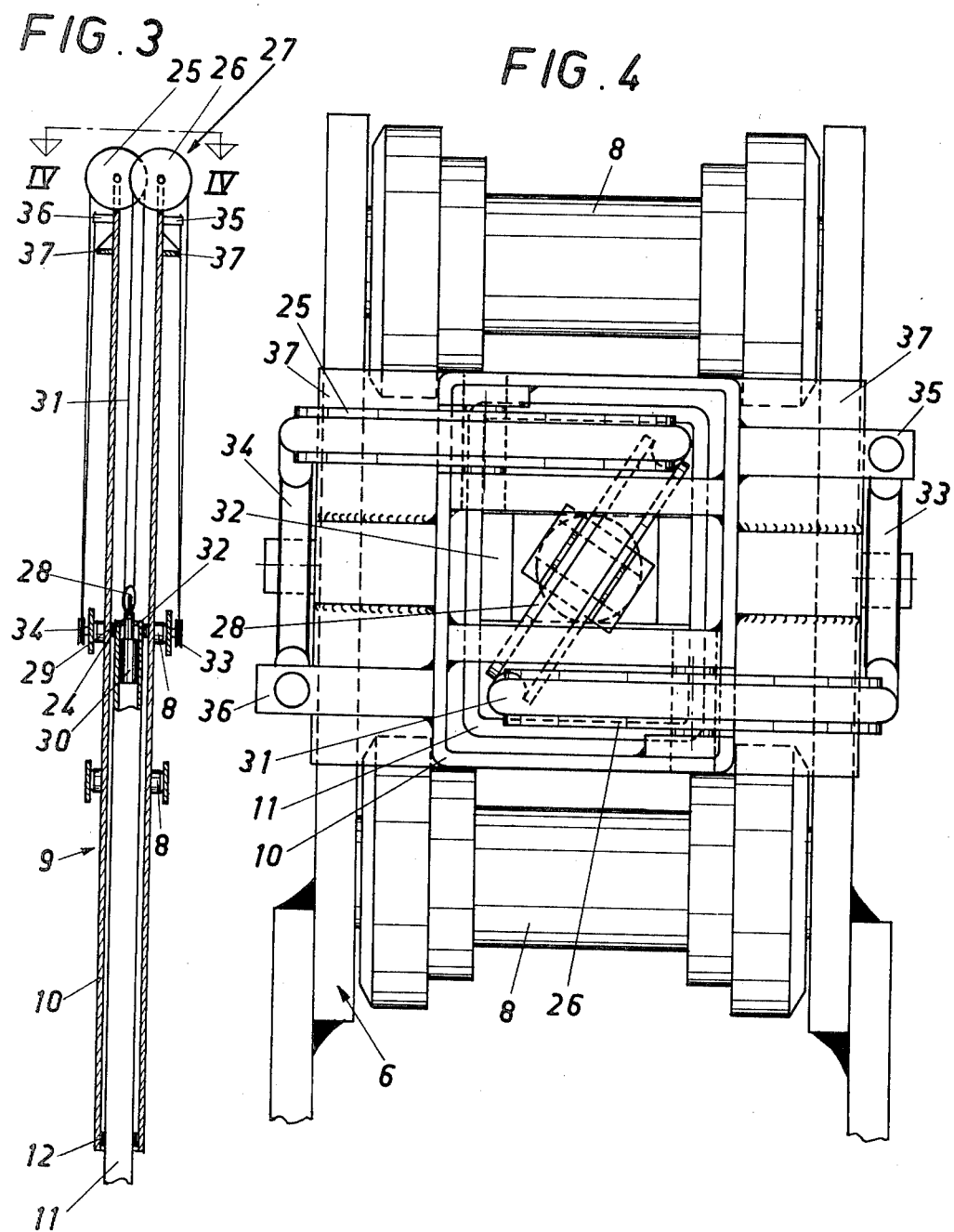

U.S. Patent  Sep. 16, 1980  Sheet 4 of 4  4,222,878
FIG. 5
FIG. 6
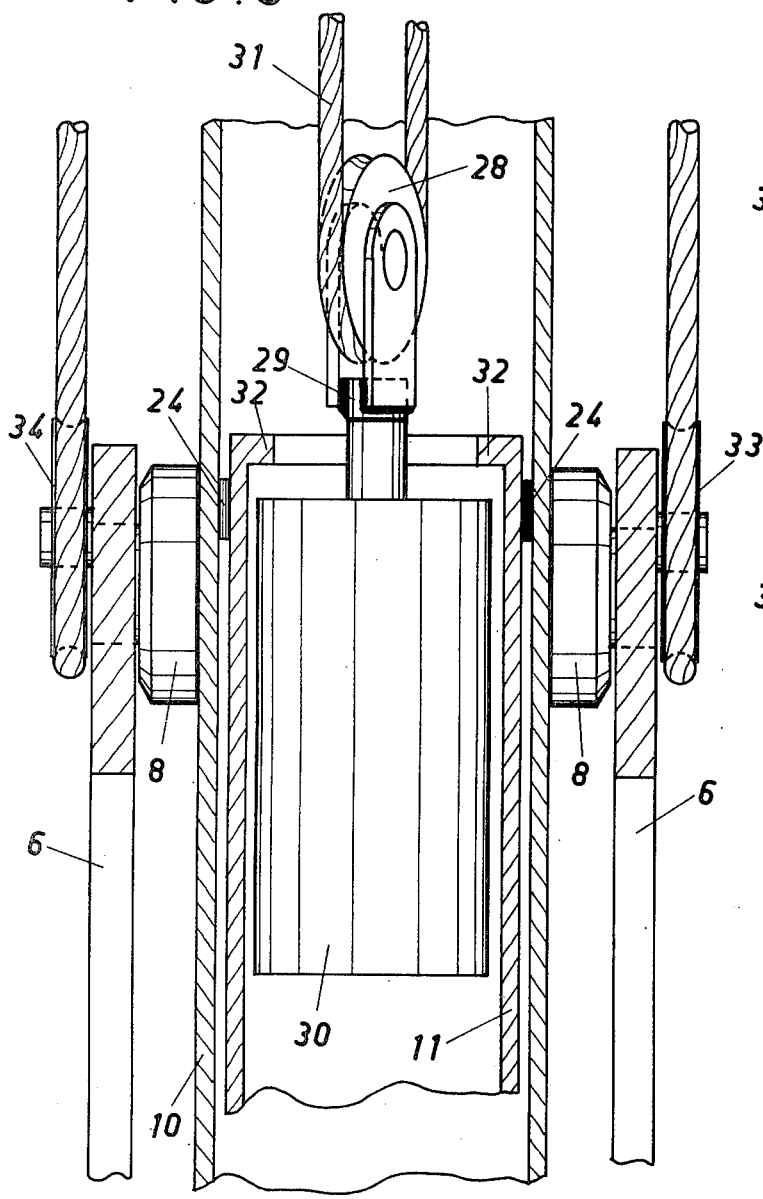
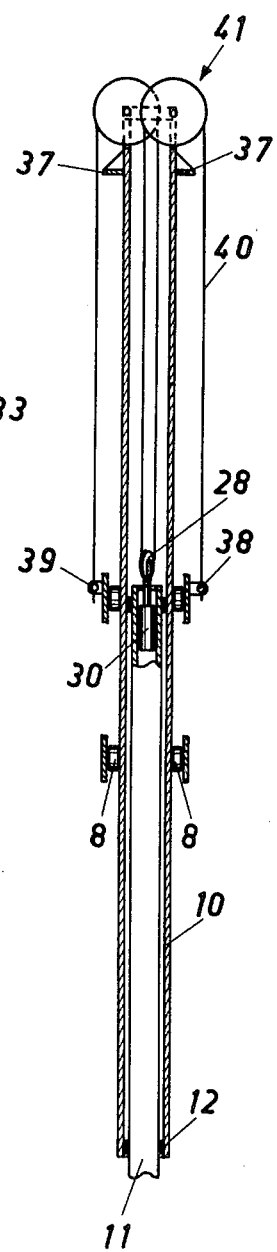

RAKING EQUIPMENT FOR TRASHRACKS

The present invention refers to a raking machine for trashracks at turbine intakes, fresh water intakes, waste water purifying plant and similar, said raking machine comprising a rake arm being vertically displaceable along the trashrack, said rake arm being supported by a support, which is displaceable lengthwise of the trashrack.

In such plants where the trashracks are very deep very long rake arms are required in order to remove trash accummulated along the whole depth of the rack. Since the rake scraping against the rack has to be pulled up over the water level the rake arm projects a considerable distance upwards and in this position exerts strong stresses upon the support and the carriage. Above the raking machine a large free space is further required and said space is not always available. For depths down to 5 meters it has been possible to guide the rake arm without having to oversize the support and the carriage. For greater depths other means have been used, e.g. a fixed rake arm extending down to the lower part of the trashrack and a movable rake being arranged along said rake arm. Since the rake arm is always under water, so is its operating means, and thus they are tempered with damage from objects floating in the water and trash transported along the rack by the rake. The reliability for such devices is therefore low.

The purpose of the present invention is to provide a raking machine which without having to be oversized can work with a movable rake arm down to relatively great depths without the support and the carriage being exerted to uneven loads. This has been achieved thereby that the rake arm comprises at least two tube members being telescopically displaceable in relation to each other and connected to each other by a block means, at which at least one pulley is arranged at the upper end of each tube member and a wire is laid about said pulleys, said wire being connected to the support by at least one pulley or a fixed attachment.

The invention will now be further described with reference to the accompanying drawings showing some embodiments.

Figure 2:
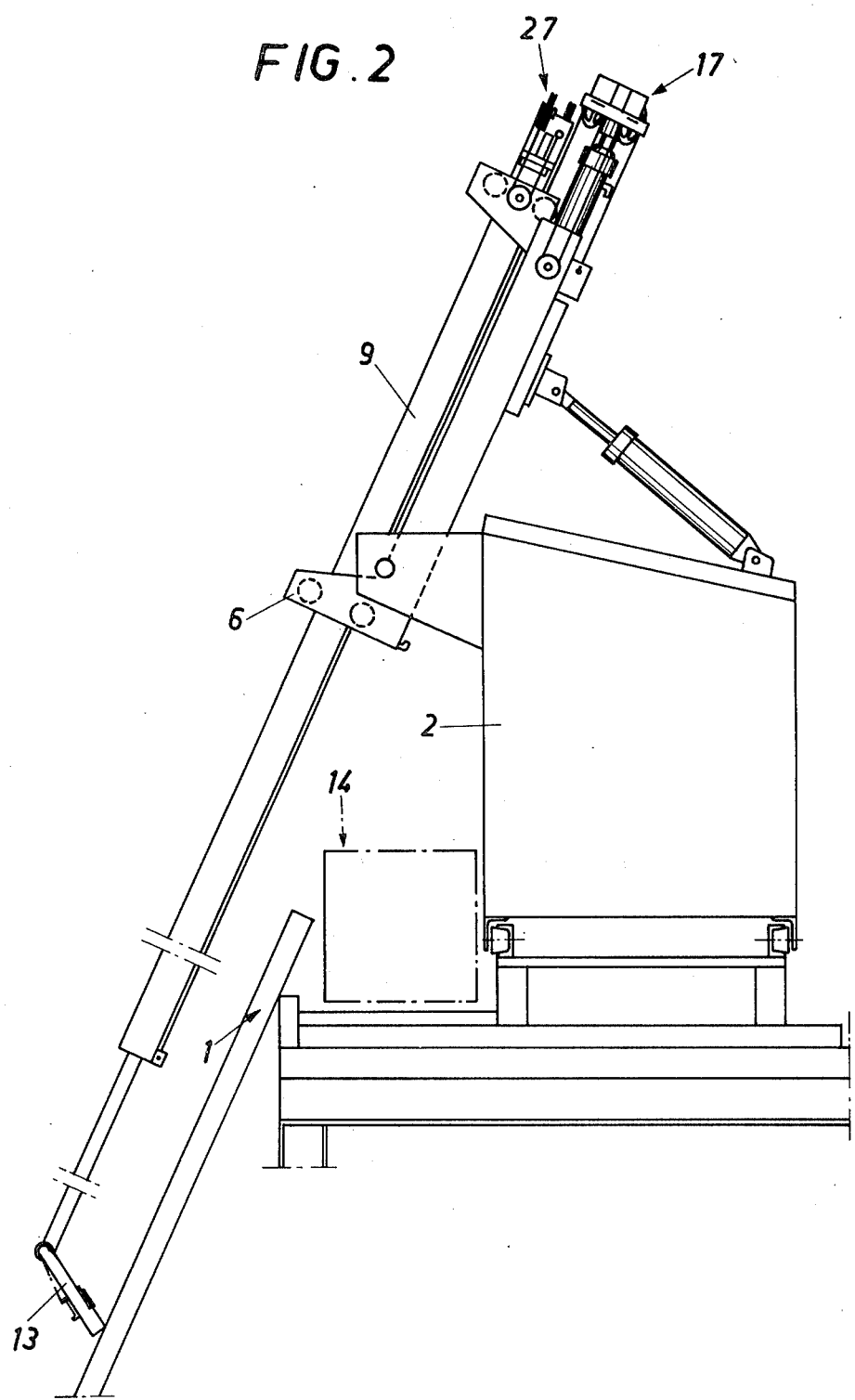

FIG. 1 is a side view of the raking machine with the rake arm in its upper end position, FIG. 2 is a side view of the raking machine in working position with the rake arm being projected, FIG. 3 is a section through the telescopically designed rake arm with its block discs and wires, FIG. 4 is a plane view of the rake arm and the support, FIG. 5 shows on a larger scale a detail of a part of the guidance of the rake arm against the support and the stretching means for the wire, FIG. 6 is a view of the rake arm analogous to FIG. 3 but with another gearing of the block means.

FIG. 1 shows how a raking machine according to the invention can be designed. It comprises a carriage 2, which is movable along the upper edge of the rack 1, e.g. on rails 3, and a hydraulic or electric/electronic equipment for controlling and operating the raking machine can be arranged in the carriage 2. On the upper part of the carriage 2 a hydraulic cylinder 4 is pivotally arranged, at which its piston rod 5 is pivotally connected to the upper part of support 6. The lower part of the support 6 is pivotally arranged in an attachment 7 projecting from the carriage. By this arrangement the angle of the support 6 to e.g. a trashrack 1 at a water intake or the like can be easily adjusted.

By means of the support 6 the rake arm 9 can be guided upwards and downwards along the trashrack 1, at which trash can be drawn up and loaded in a chute or a carriage 14.

At the upper and lower part of the support 6 guide rolls are arranged against which the outer preferably square tube 10 of the rake arm 9 runs. The rake arm 9 comprises a further tube 11 of a smaller size telescopically arranged in said first tube 10, at which the inner tube 11 is guided e.g. by polytetrafluoreten bearings attached at the insides of the outer tube 10. At rake 13 is springingly attached to the lower end of the inner tube 11 and is arranged to run against e.g. the above mentioned trashrack 1.

A second hydraulic cylinder 15 is fixed in said support 6 and at some distance runs parallel to the rake arm 9. The hydraulic cylinder 15 is substantially longer than the support 6 and thus projects above this. On the upper end of the piston rod 16 a block means 17 comprising two pulleys 18, 19 is arranged. The wire 20 runs from an attachment point 21 on the support 6 up over a first pulley 18 on the upper end of the piston rod 16, down around a second pulley 22 at the support, after that up again and over a third pulley 19 and at last down to a second attachment point 23 situated at the lower part of the outer tube 10 of the rake arm 9. In this way a gearing of 1:4 between the piston rod 16 and the outer tube 10 of the rake arm 9 is obtained. This arrangement is shown in FIG. 2, which besides that shows the raking machine in its working position with the rake 13 contacting the trashrack 1.

FIG. 3 is a section through the rake arm 9. On the inner telescopically arranged and preferably square tube 11 further polyetrafluoreten (teflon) bearings 24 are arranged, by which the inner tube 11 is guided against the outer tube 10. The outer tube 10 of the rake arm 9 slides against guide rolls 8 attached in the support 6 and has at its upper end two pulleys 25, 26, which are part of a second block means on the raking machine 27. A third pulley 28 is by means of a swivel 29 pivotally attached in a weight 30 constituting a stretching means for the wire 31, at which the weight can run free down through the inner tube 11. In its normal working position the weight 30 however contacts an abutment 32 in the upper part of the inner tube 11, at which the inner tube can be displaced upwards. The wire 31 is herewith always stretched also in the case where the inner tube 11 would get caught or bump against an obstacle when projected. On both sides of the upper part of the support 6 at the two upper guide rolls 8 two further pulleys 33, 34 are arranged. One end of the wire 31 is thus fixed in an attachment 35 on the upper outer part of the rake arm 9, from which the wire 31 runs down to a first pulley 33 arranged at one side of the support 6. From there the wire 31 runs upwards to a second pulley 26 arrranged at the upper outer part of the rake arm 9 and after that down to the pulley 28, which by way of the weight 31 is attached in the inner tube 11 of the rake arm 9. The wire 31 then runs up to the fourth pulley 25 on the rake arm 9, after which it by way of the fifth pulley 34 arranged on the support 25 with its other end is fixed to an attachment 36 on the outer part of the rake arm. A gearing of 1:3 is obtained by this block means.

Stop members 37 are arranged on both sides of the upper outer part of the rake arm 9, said stop members 37 being arranged to prevent the rake arm from "sliding out" in its projected position from the guide rolls 8 on the support 6.

If at any application a lower gearing is preferred the block means 27 according to FIG. 3 can be made less complicated, at which the two pulleys 33, 34 on the support 6 can be eliminated and substituted by attachment points 38, 39 for both ends of the wire 40 as is shown in FIG. 6. The gearing for this block means 41 is 1:2.

As can be understood from the above stated it is possible to operate a rake arm with a long reach by means of a hydraulic cylinder of a moderate size.

The total gearing of the both above described block means 17, 27 (according to FIGS. 1 and 3) is 1:12, which involves that when the piston rod 16 of the hydraulic cylinder 15 is displaced 1 meter a displacement of 12 meters of the rake 13 is achieved. Among the advantages of raking machines of this kind it can be mentioned that space, especially vertically, is saved and that the centre of gravity of the device will be situated at a low level even when the raking machine is in its "resting position", which means that the construction does not have to "oversized".

I claim:

1. A raking machine for a trashrack comprising support means displacably mounted for lateral movement along the trashrack, a rake arm carried by said support means for vertical movement along the trashrack, said rake arm comprising inner and outer telescopic members, drive means for lifting and lowering said outer telescopic member relative to said support means and drive transmission means for effecting telescoping movements of said inner member relative to said outer member responsive to movements of said outer member relative to said support means, said drive transmission means comprising a wire and pulley system including a first pulley means at the upper end of said outer member, a wire trained around said pulley means having its ends fixed relative to said support means, said wire including a bight internally of said outer member, said inner member being suspended from said bite.

2. The machine of claim 1 including tensioning means for said wire comprising a pulley associated with said bight in the wire and a weight attached to said pulley, said weight being located internally of said inner member and said inner member including an abutment for said weight allowing the weight to lift the inner member relative to the outer member when the length of said bight is decreased.

3. The machine of claim 1 or claim 2 wherein said drive means includes a piston and cylinder assembly attached to said support means, further pulley means carried by the piston rod of said piston and cylinder assembly, a fixed pulley on said support means and a further wire trained around said further pulley means and around said fixed pulley and said wire having one end fixed relative to said support means and the other end fixed relative to said outer member.

* * * * *